(12) United States Patent
Sullivan

(10) Patent No.: US 9,347,254 B2
(45) Date of Patent: May 24, 2016

(54) COMMAND PRIORITY LEVELS FOR AN ACCESS CONTROLLER APPARATUS

(75) Inventor: Edward S. Sullivan, Addison, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 578 days.

(21) Appl. No.: 13/464,636

(22) Filed: May 4, 2012

(65) Prior Publication Data

US 2013/0297047 A1 Nov. 7, 2013

(51) Int. Cl.
| | |
|---|---|
| *E05F 15/00* | (2015.01) |
| *E05F 15/70* | (2015.01) |
| *G07C 9/00* | (2006.01) |
| *G05B 19/042* | (2006.01) |

(52) U.S. Cl.
CPC ............ *E05F 15/70* (2015.01); *G05B 19/0423* (2013.01); *G07C 9/00134* (2013.01); *G05B 2219/2222* (2013.01); *G05B 2219/2628* (2013.01)

(58) Field of Classification Search
None
See application file for complete search history.

(56) References Cited

U.S. PATENT DOCUMENTS

| | | | |
|---|---|---|---|
| 4,808,995 A | 2/1989 | Clark et al. | |
| 5,850,753 A * | 12/1998 | Varma | 70/278.7 |
| 6,000,505 A * | 12/1999 | Allen | 187/391 |
| 6,326,754 B1 | 12/2001 | Mullet et al. | |
| 6,806,665 B2 | 10/2004 | Fitzgibbon et al. | |
| 6,833,681 B2 | 12/2004 | Fitzgibbon | |
| 7,012,503 B2 * | 3/2006 | Nielsen | 340/5.6 |
| 7,127,847 B2 | 10/2006 | Fitzgibbon et al. | |
| 7,262,572 B2 | 8/2007 | Fitzgibbon | |
| 7,280,030 B1 * | 10/2007 | Monaco | 340/5.21 |
| 7,441,264 B2 * | 10/2008 | Himmel et al. | 726/2 |
| 7,525,412 B2 | 4/2009 | Jankovsky | |
| 8,228,167 B2 * | 7/2012 | Maruya et al. | 340/5.8 |
| 8,230,980 B2 * | 7/2012 | Mason | 187/388 |
| 8,565,902 B2 * | 10/2013 | Jones et al. | 700/9 |
| 8,749,343 B2 * | 6/2014 | Cirker | 340/3.1 |
| 8,769,608 B2 * | 7/2014 | Sampigethaya et al. | 726/1 |
| 2006/0080541 A1 * | 4/2006 | Monaco et al. | 713/182 |
| 2007/0222554 A1 * | 9/2007 | Hart | 340/5.6 |
| 2008/0224862 A1 * | 9/2008 | Cirker | 340/541 |
| 2010/0156628 A1 * | 6/2010 | Ainsbury et al. | 340/540 |
| 2010/0156630 A1 * | 6/2010 | Ainsbury | 340/540 |

* cited by examiner

*Primary Examiner* — Christopher E Everett

(74) *Attorney, Agent, or Firm* — Fitch Even Tabin & Flannery LLP

(57) ABSTRACT

An access controller apparatus and method for controlling physical access to an area are provided to determine a current priority level setting of the access controller and to ignore a received command in response to a comparison of the priority level of the received command to the current priority level setting of the access controller. Thus, a prioritized response to commands is provided such that commands of certain priority levels can be acted upon in certain situations. This helps allow for proper responses to multiple conflicting commands and for prioritized responses to commands of greater importance or of universal impact.

30 Claims, 4 Drawing Sheets

| PRIORITY LEVEL: | COMMAND: |
|---|---|
| 5 | SET PRIORITY LEVEL TO 0 |
| 4 | SET PRIORITY LEVEL TO 1 |
| 3 | SET PRIORITY LEVEL TO 2 |
| 2 | EMERGENCY HOLD OPEN |
| 1 | OPEN-HOLD-OPEN, CLOSE-HOLD-CLOSED, STOP-HOLD-STOPPED |
| 0 | OPEN, CLOSE, STOP |

*200*

COMMAND PRIORITY LEVELS FOR AN ACCESS CONTROLLER APPARATUS

TECHNICAL FIELD

This invention relates generally to access controllers, and more particularly to commands for access controllers.

BACKGROUND

Access controllers, as are generally known in the art, can respond to any number of commands to influence operation of the access controller to control physical access to an area. Over time, the number of possible commands that an access controller can respond to has grown. Similarly, the complexity of the individual commands has grown along with an access controller's response to these commands. For example, a single command may cause the access controller to perform multiple tasks simultaneously or in succession.

With this increased quantity and complexity of commands, an access controller will often receive multiple commands, some of which may be in conflict with each other. For example, a later received command may directly conflict with an earlier received command wherein performing the task associated with the later received command would conflict with a previously or continuously performed task associated with the earlier received command. Additionally, some commands may be deemed of greater importance than others or have more of a universal impact than others.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking and pursuant to these various embodiments, an access controller apparatus for controlling physical access to an area comprises at least an input device configured to receive at least one command to influence operation of the access controller and a processing device connected to the input device. The processing device is configured such that it can determine a current priority level setting of the access controller and ignore a received command based on a result of the comparison between the priority level of the received command and the current priority level of the access controller.

So configured, the access controller can provide a prioritized response to commands such that, by at least one embodiment, only commands of the same or higher priority level than a current priority level setting of the access controller can be acted upon. In another embodiment, only commands of a higher priority level than a current priority level setting of the access controller can be acted upon while ignoring commands of the same priority level. By one approach, the current priority level setting of the access controller can be set by a specific command to set the priority level setting to a specific level. By another approach, the current priority level setting can simply be that of the highest priority level command previously received. By another approach, the current priority level setting can be set to match that of a received command having a higher priority level than the priority level setting of the access controller at the time of receipt. Thus, by way of at least one example, if an access controller receives a command with a specific priority level to influence an operation to open a barrier and keep it open, the access controller may ignore later conflicting lower priority commands to close the barrier.

Figure 1:
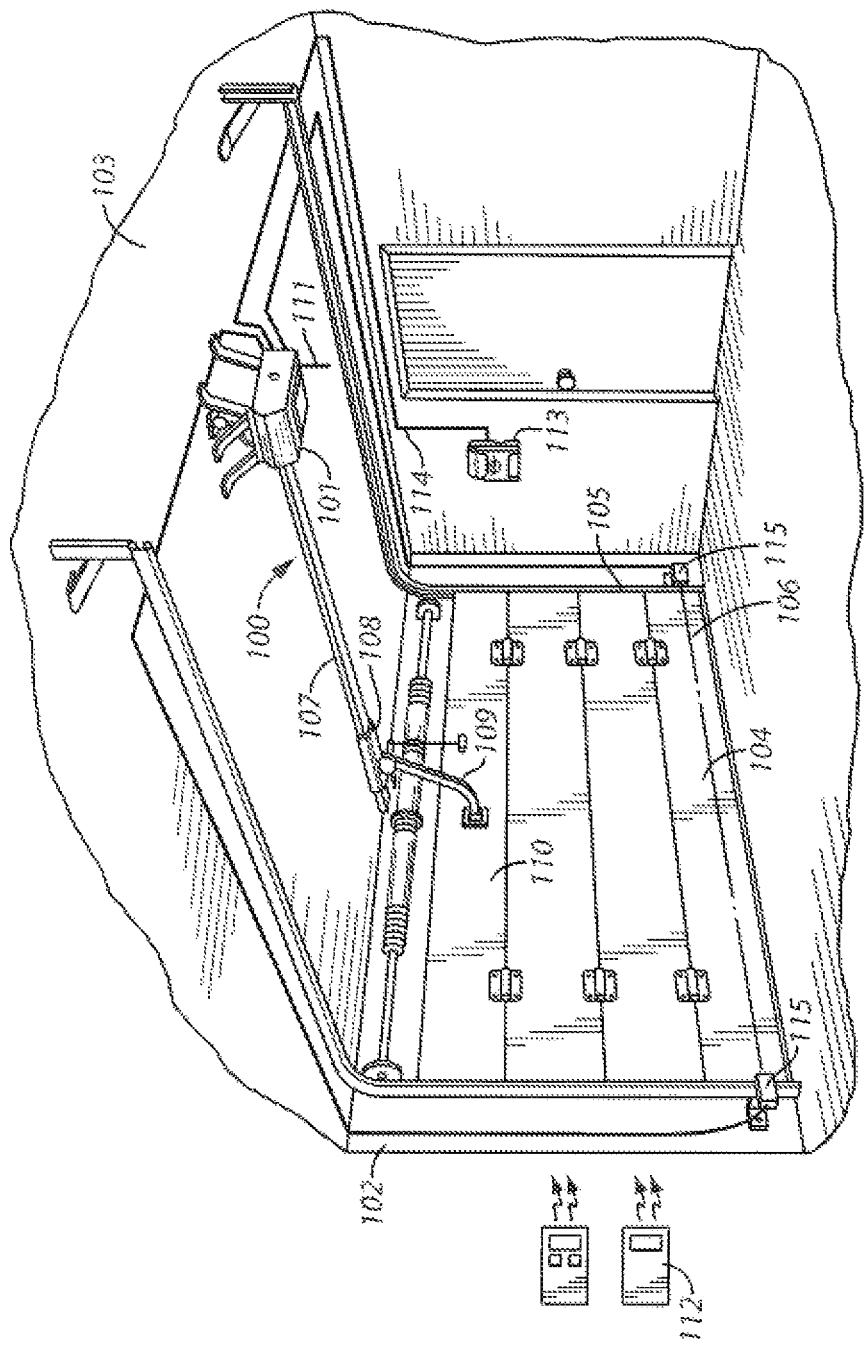
FIG. 1 comprises a contextual diagram of an access controller apparatus in accordance with various embodiments of the invention.

These and other benefits may become clearer upon making a thorough review and study of the following detailed description. Referring now to the drawings, and in particular to FIG. 1, it may be helpful to first describe an illustrative application setting of an access controller apparatus 100. It will be understood that the specifics of this example are intended to serve only in an illustrative regard and are not intended to express or suggest any corresponding limitations with respect to the scope of these teachings.

In this illustrative example, an access controller apparatus 100 comprises a movable barrier operator 101, such as the garage door operator 101 positioned within a garage 102 depicted in FIG. 1. The garage door operator 101 mounts to the garage ceiling 103 and serves to control and effect selective movement of a barrier 104 (comprising a multipanel garage door in this illustrative example). The barrier 104 may include a plurality of rollers rotatably confined within a pair of tracks 105 positioned adjacent to and on opposite sides of the garage opening 106.

The example access controller apparatus includes a head unit optionally having a motor 303 (FIG. 3) to provide motion to the barrier 104 via a rail assembly 107. The rail assembly 107 includes a trolley 108 for releasable connection of the head unit to the barrier 104 via an arm 109. The arm 109 connects to an upper portion 110 of the barrier 104. The trolley 108 connects to an endless chain (or belt or the like) that effects the desired movement of the trolley 108 and hence the door 104 via the arm 109. This chain can be driven by a sprocket that couples to the aforementioned motor 303 in the head unit. A wall control unit 113 communicates over a wireline connection 114 with the head unit of the movable barrier operator 101 to send commands to the movable barrier operator 101 to control movement of the barrier 104 or other components, such as, for example, a light. The access controller apparatus 100 may also be responsive to commands received from radio transmitters 112, wherein the transmitters 112 may comprise portable transmitters (such as keyfob-style transmitters) or keypad transmitters (such as those often mounted or installed in automobile sun visors). The entire head unit is typically powered from a power supply.

In addition, in this illustrative example the movable barrier operator 101 includes an obstacle detector 115 that optically or via an infrared-pulsed beam detects when the garage door opening 106 is blocked and signals the movable barrier operator 101 accordingly of the blockage. The movable barrier operator 101 can then, for example, cause a reversal or opening of the barrier 104 to avoid contact with the obstacle.

Those having skill in the art will understand that the access controller apparatus 100 can be any device that controls physical access to an area, and is not limited to a garage door operator 101, but may comprise other movable barrier operators, such as sliding, swinging, or lifting gate operators, barrier arm operators, commercial door operators, or other automatic door operators. In other embodiments, the access controller apparatus 100 may not comprise a movable barrier operator and may lack the ability to physically move the barrier 104. In such an instance, the access controller apparatus 100 may instead be a logical controller which operates to grant or deny access to a restricted or secured area based on a set of rules or operations. Such examples include basic lock controllers, telephone entry systems, and any other device designed to grant or deny physical access to a restricted area. By some embodiments, the access controller apparatus 100 may communicate with or control a separate and distinct movable barrier operator 101 to effect movement of a barrier 104 (for example, through link 306 in FIG. 3). Communication may be by means of relay contact closure or other wireline communication, or by wireless transmissions.

Figures 2, 3:
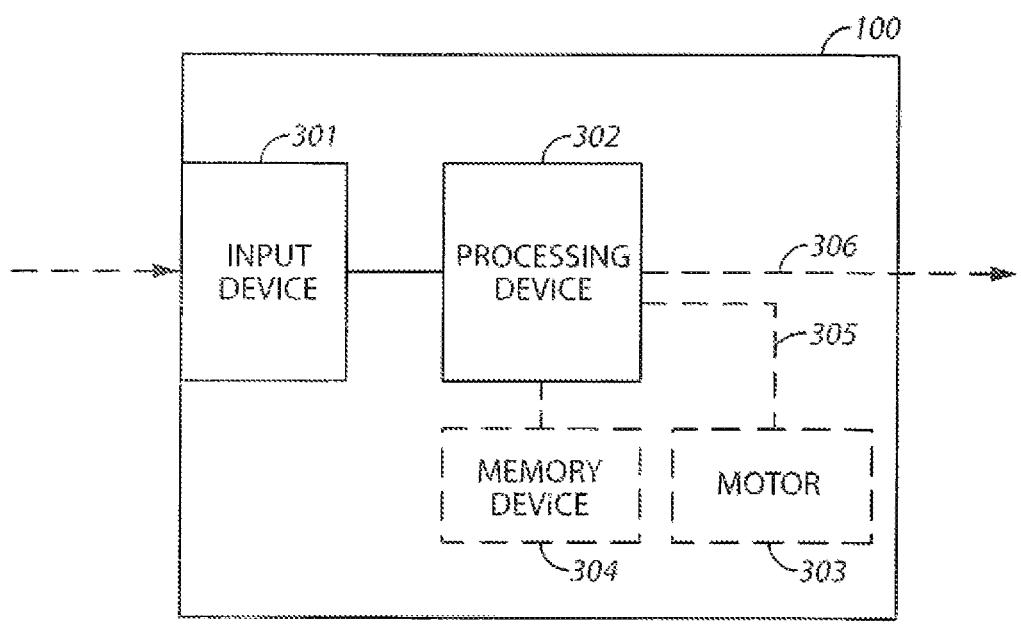
FIG. 2 comprises an example command priority structure in accordance with various embodiments of the invention.
FIG. 3 comprises an illustration depicting further detail of the access controller apparatus in accordance with various embodiments of the invention.

With reference now to FIG. 2, an example command priority structure 200 is illustrated in accordance with various embodiments of the invention. Various commands are each assigned at least one priority level. In this example, a priority level of "0" represents the lowest priority level, with subsequent increasing priority levels having a higher priority corresponding to their priority ranking above priority level "0" (i.e., 1, 2, 3, etc.). In the context of an access controller apparatus 100, some example commands having a priority level "0" (or the lowest priority level) may include an open command, a close command, or a stop command. In this context, each of these commands directly corresponds to the respective descriptive movement of a movable barrier 104. Movement is effected either directly by the access controller apparatus 100 or through the aid of a separate movable barrier operator 101. As is readily understood, an "open" command opens the movable barrier 104, a "close" commands closes the movable barrier 104, and so forth.

Commands corresponding to priority level "1" may comprise open-hold-open, close-hold-closed, and stop-hold-stopped commands. These are examples of compound commands, wherein one command produces multiple actions (e.g., open the movable barrier 104, and then hold it open), though not all commands associated with a certain priority level need be compound commands. In response to receiving an open-hold-open command, the access controller apparatus 100 may effectuate opening the movable barrier 104 to the open position (either directly or through the use of a separate movable barrier operator 101), if it is not already at the open position, and keeping the movable barrier in the open position. Keeping the barrier 104 in the open position may entail overriding a timer-to-close function that would otherwise close the movable barrier 104 after a set amount of time or inactivity, or a scheduled close operation. A close-hold-closed command operates much the same, but simply in reverse, moving the barrier 104 to the closed position, if not already there, and holding the movable barrier in the closed position. A stop-hold-stopped command will stop movement of the barrier during travel and hold the movable barrier at that mid-travel position. Continuing with this example, an emergency hold open command is assigned a priority level "2" and acts similarly to an open-hold-open in that it opens the barrier 104 and keeps it open. It may be given a higher priority due to the emergency nature, thus preventing overriding of the function by other commands associated with the same priority level when commands of the same priority level are not ignored, as may be possible in some embodiments.

By one approach, sets of commands within one priority level (or spanning multiple priority levels) may actually be triggered from a single signal from a transmitter 112 or other signal generating device attached to or in communication with the access controller apparatus 100 (such as the wall control unit 113). In such an instance, the actual command followed by the access controller apparatus 100 is subject to the current state of the access controller apparatus 100 (or of the movable barrier 104) rather than simply the contents of a command in the received signal. For example, an access controller apparatus 100 comprising a garage door operator will open the garage door when it is currently closed in response to a user pressing a button on a transmitter, which sends a signal to the garage door operator. Conversely, if the door is in the open position and the user presses the same button (resulting in the same signal being sent), the garage door operator will determine the current state of the door (open) and act in response to receiving that same signal by closing the door. Additionally, if the user presses the same button (resulting in the same signal being sent) during travel to the open or closed positions, the garage door operator may determine the current state of the door (moving) and act by stopping movement.

By selectively assigning priority levels to individual or compound commands, commands of certain priority levels can be ignored in certain situations based on results of comparisons between a priority level of a received command and a current priority level setting of the access controller apparatus. Specifically, by at least one embodiment, commands of lower priority levels can be ignored when a command of a higher priority level has previously been received and acted upon by the access controller apparatus. For example, if an open-hold-open command having priority level "1" has been received, the access controller apparatus 100 would act in accordance with this command and set its own current priority level setting to be "1" (possibly in a volatile or non-volatile memory or a register) and would ignore subsequent received lower priority level commands to close the movable barrier. By at least one approach, this would continue until the current priority level setting of the access controller apparatus 100 is set to level "0" once again, at which time the access controller apparatus 100 would be responsive to open, close, and stop commands.

Referring now to FIG. 3, the access controller apparatus 100 for controlling physical access to an area is described in further detail. The access controller apparatus 100 includes an input device 301, which may comprise any input device 301 capable of receiving commands. For example, the input device may comprise a radio frequency receiver to receive coded radio frequency transmission from one or more radio transmitters 112. The input device could also comprise a wireline receiver or interface configured to receive commands via a wireline connection, such as, for example, wireline connection 114 in FIG. 1. The input device 301 may also comprise a network adaptor configured to receiving wireless or wire-based network (such as IP based communication or the like). The access controller apparatus 100 also comprises a processing device 302 operatively connected to the input device 301. The processing device 302 may be any suitable type of processing device as are known in the art, including, but not limited to, one or more central processing units, pic processors, microprocessors, multi-core or single-core processors, programmable logic arrays, digital signal processors, and the like. Those skilled in the art will recognize and appreciate that such a processing device 302 can comprise a fixed-purpose hard-wired platform or can comprise a partially or wholly programmable platform. All of these architectural options are well known and understood in the art and require no further description here.

Optionally, as previously described, the access controller apparatus 100 may further comprise a movable barrier operator 101 so that the access controller apparatus 100 may also include a suitable motor 303, as are known in the art, or other means to effect actual physical movement of a physical barrier 104 (such as a gate or a door). The motor 303 may be communicably and/or operably connected to the processing device 302 as indicated by connection 305.

Also, in addition to the motor 303, or in lieu thereof, the access controller apparatus 100 may communicate with or control a separate and distinct movable barrier operator 101 to effect movement of a barrier 104. This may be achieved through a link 306 that communicatively or operatively links the processing device 302 of the access controller apparatus 100 to the separate and distinct movable barrier operator 101. By a preferred approach, the link 306 further comprises other components as are commonly known in the art (not shown) to effectuate the communication link 306. Example components may include relay closures, serial or parallel communication hardware (such as RS-232, RS-422, RS-485, and the like), USB connection hardware, TCP/IP ports and hardware, WiFi connection hardware, or other known components to effectuate an appropriate wireline or wireless link 306.

The input device 301 is configured to receive at least one command to influence operation of the access controller apparatus 100, which is then communicated to the processing device 302. The processing device 302 is configured to determine a current priority level setting of the access controller apparatus 100 and compare a priority level of the at least one command received by the input device 301 to the current priority level setting of the access controller apparatus 100 to produce a comparison result. The processing device 302 can be further configured to ignore the at least one command in response to the result of the comparing.

By at least one other approach, the processing device 302 is configured to determine that the priority level of the at least one command is lower than the current priority level setting and responsively ignore the at least one command.

By another approach, the processing device 302 is further configured to determine whether a priority level of the at least one command is a same or lower priority level than the current priority level setting of the access controller apparatus 100. If so, the processing device 302 will also responsively ignore the at least one command. Thus, by this alternate embodiment, the received command must at least be a higher priority level than the current priority level setting of the access controller apparatus 100 for the access controller apparatus 100 to operate according to the received command. This is slightly distinguishable from the previously described embodiment above, wherein the access controller apparatus 100 will also operate according to the received command if it is the same priority level as the current priority level setting.

By another embodiment, the access controller apparatus 100 may further comprise at least one memory device 304 operatively connected to the processing device 302. This memory device 304 may be any type of memory as are generally known in the art. The memory device 304 may store a plurality of commands that are individually associated with at least one priority level. The processing device 302 may be further configured to determine the priority level associated with a received command by determining a priority level associated with at least one matching stored command within the plurality of commands stored in the memory device 304.

By another approach, to determine the current priority level setting for the access controller apparatus 100, the processing device 302 may be further configured to receive at the input device 301 at least one other command comprising at least one instruction specifying the current priority level setting of the access controller apparatus 100. Returning briefly to FIG. 2, examples of such priority-level-specifying commands are depicted at priority levels 3, 4, and 5. Upon receipt of one of these commands, the processing device 302 will set the current priority level setting of the access controller apparatus 100 to the appropriate corresponding priority level setting according to the received command. Alternatively, the priority-level-specifying commands (shown at priority levels 3, 4, and 5) may all be associated with the same priority level. By many embodiments, it may be preferred, though not necessary, to associate all or some of the priority-level-specifying commands with a higher priority level than all other non-priority-level-specifying commands (such as open, close-hold-closed, emergency hold open, etc) or with the highest available priority level. If not, the access controller apparatus 100 may become "stuck" at a higher priority level without a means to set the current priority level to a lower one as all priority-level-setting commands would be ignored.

On the other hand, situations may exist where it is desired that even priority-level-specifying commands be ignored. For example, it may be beneficial to associate an emergency hold open command with the highest available priority level so that there is no chance that the command can be accidentally overridden in an emergency situation by a user with authority to specify the current priority level. Such a configuration may require a hard reset of the access controller apparatus 100 to clear a current priority level setting, possibly returning the access controller apparatus 100 to a default current priority level setting. By at least one approach, the default setting is the lowest available priority level setting (or "0" in this example). Thus, the hard reset would reset the current priority level setting to the default level and allow the access controller apparatus 100 to operate as normal. However, in other embodiments, the access controller apparatus 100 may be configured to store the current priority level in a non-volatile memory medium, wherein a hard reset may not clear its value. In such an instance, it would be beneficial to include at least one priority-level-setting command associated with the highest priority level, as previously described.

By an alternate approach, the processing device 302 may be configured so that if the current priority level setting of the access controller apparatus 100 is set to a default priority level, which may or may not be the lowest available priority level, the processing device 302 may act upon other commands associated with the same default priority level. However, in this same approach, if the current priority level setting is anything other than the default priority level, then the processing device 302 can ignore other received commands associated with the same priority level as the currently set non-default priority level. For example, and with brief reference again to FIG. 2, if the current priority level setting is set to a default "0," the processor will respond to received commands associated with the "0" priority level (e.g., open, close, stop). However, if the current priority level setting is "1" due to, for example, a previous reception of an open-hold-open command, the processing device will ignore other commands associated with priority level "1." That is, the access controller apparatus 100 will not respond to a close-hold-closed after it had received the open-hold-open command. By this, a sort of hybrid approach is described wherein the processing device 302 ignores not only commands less than the default level when the current priority level is set to the default level, but will also ignore commands less than or equal to a non-default priority level when the current priority level is set to the non-default priority level.

Additionally, by at least one other approach, to determine the current priority level setting for the access controller apparatus 100, the processing device 302 may be further configured to determine a highest priority level of one or more commands of a set of previously received commands. For example, if the access controller apparatus 100 has previously received at least one command associated with a priority level "1" (for example, an open-hold-open command) within a set of previously received commands and received no other command of a higher priority level, then the processing device 302 will determine that the current priority level setting for the access controller apparatus 100 is "1." This determination may occur at one time by examining a historical record of previously received commands or may be made continuously through comparison of priority levels of received commands with the current priority level setting as commands are received and updating a register, flag, or other static or dynamic data storage means if the received command is higher than the current priority level setting of the access controller apparatus 100. The set of previously received commands may comprise the set of all commands ever received by the access controller apparatus 100, all commands received since initial power-up or reset, all commands received within a certain time window (for example, the previous 24 hours), or a set number of received commands (for example, the past 20 received commands). By one example, the set of previously received commands comprises the set of all commands received since receiving at least one other command comprising at least one instruction specifying a current priority level setting of the access controller apparatus 100 (i.e., "set priority level to 0" in FIG. 2). So configured, the access controller apparatus 100 will maintain the highest previously received priority level until receiving a command to set the priority level to a different priority level.

In another example, the processing device 302 is further configured to determine whether a priority level of the at least one received command is a higher priority level than the current priority level setting of the access controller apparatus 100. If so, the processing device 302 may be configured to responsively set the current priority level setting of the access controller apparatus 100 to that of the at least one received command. By this, the current priority level setting of the access controller apparatus 100 can continuously maintain the priority level associated with the highest priority command previously received.

Figure 4:
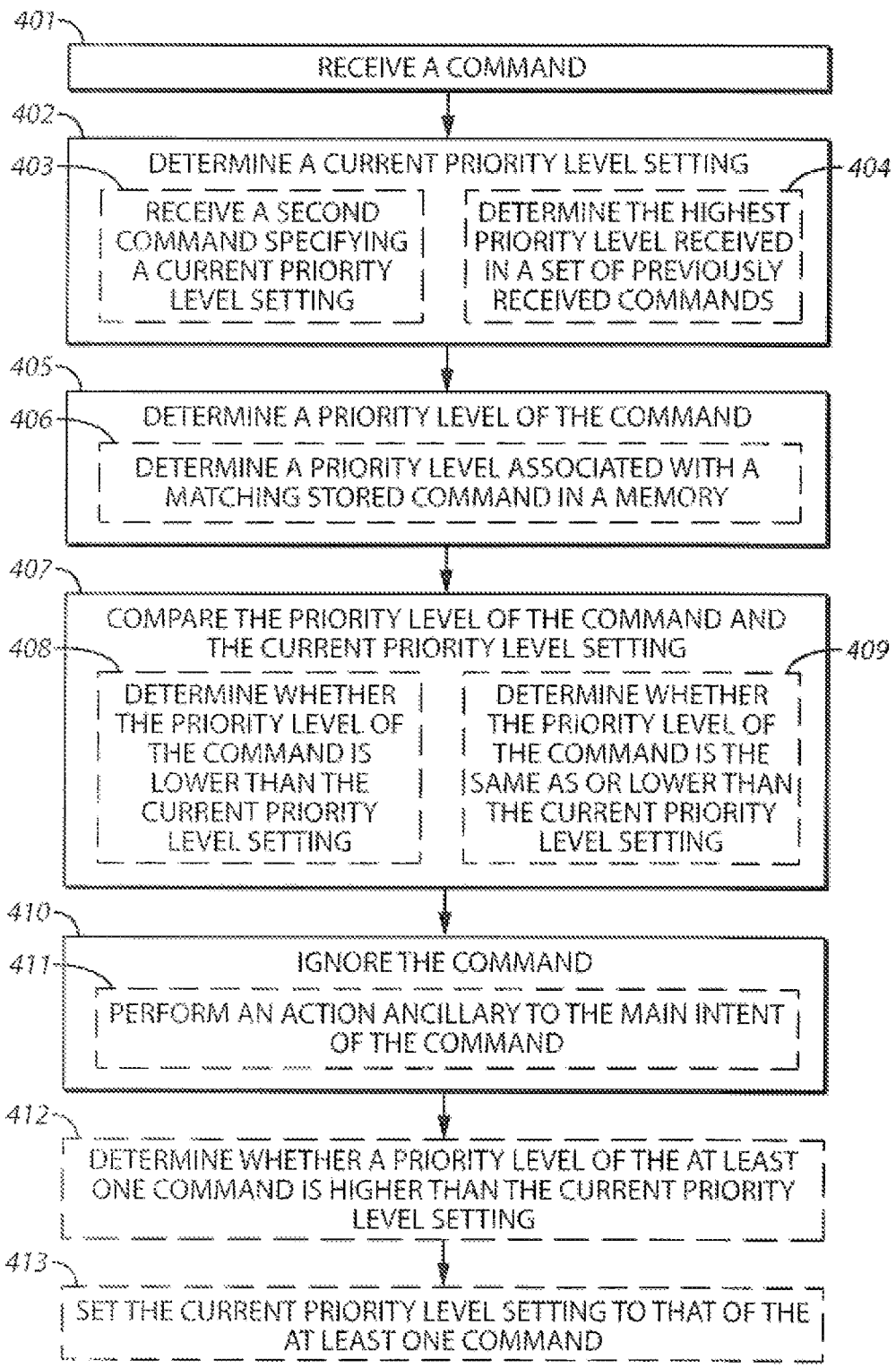
FIG. 4 comprises a flow chart in accordance with various embodiments of the invention.

Referring now to FIG. 4, a method 400 of operating at least one access controller apparatus 100 for controlling physical access to an area is depicted in accordance with at least one embodiment. At step, 401, an input device 301 receives at least one command to influence operation of the at least one access controller apparatus 100. At step 402, a processing device 302 determines a current priority level setting of the at least one access controller apparatus 100. By one approach, the processing device 302 can determine the current priority level setting by receiving 403 at least one other command comprising at least one instruction specifying a current priority level setting of the at least one access controller apparatus 100. This instruction may have been received at an earlier time wherein the processing device 302 set the current priority level setting at that time. Alternatively, the processing device 302 can determine the current priority level setting by determining 404 the highest priority level of one or more commands of a set of previously received commands. Optionally, the set of previously received commands comprises all commands received since receiving at least one other command comprising at least one instruction specifying a current priority level setting of the access controller apparatus 100. Either or both of these two determination step embodiments 403, 404 may be performed individually or conjunctively.

At step 405, the processing device 302 determines a priority level of the at least one command received by the input device. In one example, the processing device 302 makes this determination 405 by determining 406 a priority level associated with at least one matching stored command in a memory device 304.

At step 407, the processing device 302 compares the priority level of the at least one command with the current priority level of the access controller apparatus 100. Based on the result of this comparison 407, the processing device 302 may ignore 410 the command. By one approach, the comparison 407 comprises determining 408 that the priority level of the at least one command is a lower priority level than the current priority level setting of the access controller apparatus 100. In response to making this determination 408, the processing device 302 may responsively ignore 410 the at least one command.

By one other approach, the comparison 407 comprises determining 409 that a priority level of the at least one command is the same priority level as the current priority level setting of the access controller apparatus 100 or a lower priority level than the current priority level setting of the access controller apparatus 100. In response to determining 409 that the priority level of the at least one command is the same or lower priority level than the current priority level setting of the access controller apparatus 100, the processing device 302 can also ignore 410 the at least one command. Although depicted as a single step 409, the processing device 302 could perform this determining step 409 as a separate less-than comparison (such as determining step 408) and a separate equal-to comparison. This would yield the same result through the use of two separate steps rather than a single less-than-or-equal-to comparison.

Ignoring 410 the received command may comprise simply not acting upon the command (i.e., not opening the barrier 104 after having received an "open" command). However, by some embodiments, the access controller device 100, through the processing device 302, may still perform 411 other actions associated with the command that may be ancillary to the main intention of the command (i.e., open, close, stop), such as storing the command in a log of commands, storing the command in a queue of commands to be performed later, or notifying another system or user of the reception of a command. Other ancillary actions include providing an indication of the reception of the command or of the type of command received, where such indications may comprise blinking a light or producing a sound. Additionally still, a work light or task light could be turned on or off as an ancillary action to requested movement of the movable barrier. By at least one other embodiment, commands to effect operation of a work light or task light (or any other command) may be separate commands and may operate independently of the command priority level scheme described herein to cause the receiving apparatus to effect the action associated with the received command.

By another approach, the processing device 302 determines 412 whether a priority level of the at least one command is a higher priority level than the current priority level setting of the access controller apparatus 100. In response to determining 412 that the priority level of the at least one command is a higher priority level than the current priority level setting of the access controller apparatus 100, the processing device 302 may set 413 the current priority level setting of the access controller apparatus 100 to that of the at least one command and execute the action associated with that command. In another embodiment, however, the processing device 302 may not make a separate determination 412 that the received command is higher and may simply utilize a negative result of a previous step, such as that outlined in the less-than-or-equal-to determination outlined in step 409.

Figure 5:
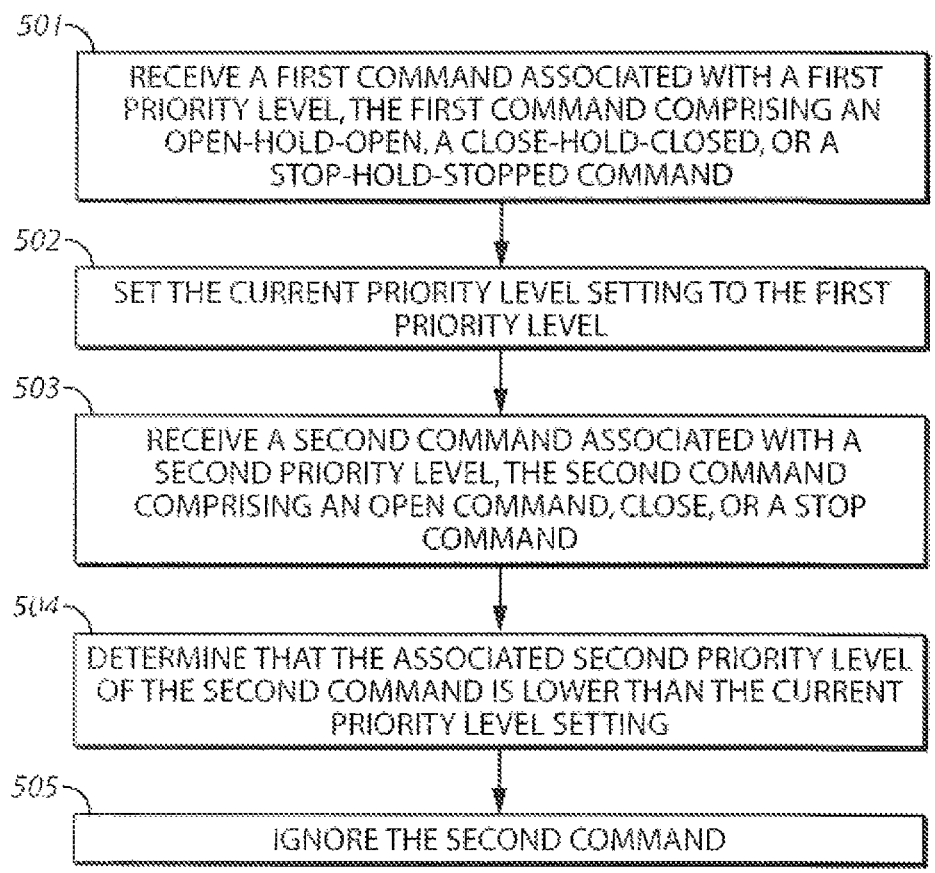
FIG. 5 comprises an additional flow chart in accordance with various embodiments of the invention.

Referring now to FIG. 5, another method 500 of operating at least one access controller apparatus 100 for controlling physical access to an area will be discussed. At step 501, an input device 301 receives a first command to influence operation of the access controller apparatus 100. The first command is associated with a first priority level, and comprises at least one of an open-hold-open command, a close-hold-closed command, or a stop-hold-stopped command (as depicted in FIG. 2). In response to receiving 501 the first command, a processing device 302 sets 502 a current priority level setting of the access controller apparatus 100 to the first priority level. At step 503, the input device 301 receives a second command to influence operation of the access controller apparatus 100. The second command is associated with a second priority level that is lower than the first priority level, and the second command comprises at least one of an open command, a close command, or a stop command (also as depicted in FIG. 2). The processing device 302 determines 504 that the associated second priority level of the second command is a lower priority level than the current priority level setting of the access controller apparatus 100 (which has previously been set to the higher priority level of the first command). In response to determining 504 that the associated second priority level of the second command is a lower priority level than the current priority level setting of the access controller apparatus 100, the processing device 302 ignores 505 the second command.

So configured, an access controller apparatus and method as described can provide a prioritized response to commands such that only commands of the same or higher priority level (or only higher, by another approach) than a current priority level setting of the access controller apparatus 100 can be acted upon. This in turn provides a solution to the problem of multiple conflicting commands received by an access controller apparatus 100 and allows a prioritized response to commands of greater importance or of universal impact.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

What is claimed is:

1. An access controller apparatus for controlling physical access to an area, the access controller apparatus comprising:
   an input device configured to receive a received command comprising one of at least two commands, wherein the at least two commands comprise at least an open command, a close command, a stop command, an open-hold-open command, a close-hold-closed command, a stop-hold-stopped command, or an emergency hold open command, wherein different ones of the at least two commands have different associated priority levels and are configured to cause different operations of the access controller apparatus;
   a processing device operatively connected to the input device and configured to:
      determine a current priority level setting of the access controller apparatus,
      determine the priority level of the received command received by the input device,
      compare the priority level of the received command and the current priority level setting of the access controller apparatus,
      ignore the received command in response to a result of the comparing,
      determine whether the priority level of the received command is a higher priority level than the current priority level setting of the access controller apparatus, and
      set the current priority level setting of the access controller apparatus to that of the received command in response to determining that the priority level of the received command is a higher priority level than the current priority level setting of the access controller apparatus and perform an operation associated with the received command.

2. The access controller apparatus of claim 1 wherein the processing device is further configured to:
   compare the priority level of the received command and the current priority level setting of the access controller apparatus by determining that the priority level of the received command is a lower priority level than the current priority level setting of the access controller apparatus, and
   ignore the received command in response to a result of the comparing by ignoring the received command when the priority level of the received command is a lower priority level than the current priority level setting of the access controller apparatus.

3. The access controller apparatus of claim 1 wherein the processing device is further configured to:
   compare the priority level of the received command and the current priority level setting of the access controller apparatus by determining that the priority level of received command is at least one of a same priority level as the current priority level setting of the access controller apparatus or a lower priority level than the current priority level setting of the access controller apparatus, and
   ignore the received command in response to a result of the comparing by ignoring the received command when the priority level of the received command is at least one of the same priority level as the current priority level setting of the access controller apparatus or a lower priority level than the current priority level setting of the access controller apparatus.

4. The access controller apparatus of claim 1 wherein the processing device is further configured to ignore the received command in response to a result of the comparing by ignoring the main intent of the command while still performing at least one action associated with the command that is ancillary to the main intent of the command.

5. The access controller apparatus of claim 1 further comprising at least one memory device operatively connected to the processing device and storing a plurality of stored commands, wherein individual ones of the plurality of stored commands are associated with at least one priority level.

6. The access controller apparatus of claim 5 wherein the processing device is further configured to determine a priority level of the received command received by the input device by determining a priority level associated with at least one matching stored command stored in the memory device.

7. The access controller apparatus of claim 1 wherein the processing device is further configured to determine the current priority level of the access controller apparatus by receiving at the input device at least one other command comprising at least one instruction specifying the current priority level setting of the access controller apparatus.

8. The access controller apparatus of claim 7 wherein the at least one other command comprising at least one instruction specifying the current priority level setting of the access controller apparatus is associated with a highest available priority level setting of the access controller apparatus.

9. The access controller apparatus of claim 7 wherein the at least one other command comprising at least one instruction specifying the current priority level setting of the access controller apparatus is a lower priority level than the emergency hold open command.

10. The access controller apparatus of claim 1 wherein the processing device is further configured to determine the current priority level setting of the access controller apparatus by determining a highest priority level of one or more commands of a set of previously received commands.

11. The access controller apparatus of claim 10 wherein the set of previously received commands comprises all commands received since receiving at least one other command comprising at least one instruction specifying a current priority level setting of the access controller apparatus.

12. The access controller apparatus of claim 1 wherein the current priority level setting of the access controller apparatus is a default priority level setting of the access controller apparatus.

13. The access controller apparatus of claim 12 wherein the default priority level setting of the access controller apparatus is a lowest available priority level setting.

14. The access controller apparatus of claim 1 wherein the received command comprises at least one compound command.

15. The access controller apparatus of claim 1 wherein the access controller apparatus comprises a movable barrier operator.

16. A method of operating at least one access controller apparatus for controlling physical access to an area, the method comprising:
receiving a received command comprising one of at least two commands having different associated priority levels, wherein the at least two commands comprise at least an open command, a close command, a stop command, an open-hold-open command, a close-hold-closed command, a stop-hold-stopped command, or an emergency hold open command, wherein different ones of the at least two commands are configured to cause different operations of the at least one access controller apparatus;
determining by a processing device a current priority level setting of the at least one access controller apparatus;
determining by the processing device the priority level of the received command;
comparing the priority level of the received command and the current priority level setting of the at least one access controller apparatus;
ignoring the received command in response to a result of the comparing;
determining by the processing device whether a priority level of the received command is a higher priority level than the current priority level setting of the at least one access controller apparatus; and
setting by the processing device the current priority level setting of the at least one access controller apparatus to that of the received command in response to determining that the priority level of the received command is a higher priority level than the current priority level setting of the at least one access controller apparatus and perform an operation associated with the received command.

17. The method of claim 16 wherein:
comparing the priority level of the received command and the current priority level setting of the at least one access controller apparatus further comprises determining by the processing device that the priority level of the received command is a lower priority level than the current priority level setting of the access controller apparatus, and
ignoring the received command in response to a result of the comparing further comprises ignoring the received command in response to determining that the priority level of the received command is a lower priority level than the current priority level setting of the access controller apparatus.

18. The method of claim 16 wherein:
comparing the priority level of the received command and the current priority level setting of the at least one access controller apparatus further comprises determining by the processing device that the priority level of the received command is at least one of the same priority level as the current priority level setting of the at least one access controller apparatus or a lower priority level than the current priority level setting of the access controller apparatus; and
ignoring the received command in response to a result of the comparing further comprises ignoring the at least one command in response to determining by the processing device that the priority level of the received command is at least one of the same priority level as the current priority level setting of the at least one access controller apparatus or a lower priority level than the current priority level setting of the access controller apparatus.

19. The method of claim 16 wherein ignoring the received command in response to a result of the comparing further comprises ignoring the main intent of the command while still performing at least one action associated with the command that is ancillary to the main intent of the command.

20. The method of claim 16 further comprising determining a priority level of the received command by determining a priority level associated with at least one matching stored command in a memory.

21. The method of claim 16 wherein determining by the processing device the current priority level setting of the at least one access controller apparatus further comprises receiving at least one other command comprising at least one instruction specifying a current priority level setting of the at least one access controller apparatus.

22. The method of claim 21 wherein the at least one other command comprising at least one instruction specifying a current priority level setting of the at least one access controller apparatus is associated with a highest available priority level setting of the at least one access controller apparatus.

23. The method of claim 21 wherein the at least one other command comprising at least one instruction specifying the current priority level setting of the access controller apparatus is a lower priority level than an emergency hold open command.

24. The method of claim 16 wherein determining by the processing device the current priority level setting of the at least one access controller apparatus further comprises determining the highest priority level of one or more commands of a set of previously received commands.

25. The method of claim 24 wherein the set of previously received commands comprises all commands received since receiving at least one other command comprising at least one instruction specifying a current priority level setting of the at least one access controller apparatus.

26. The method of claim 16 wherein the current priority level setting of the at least one access controller apparatus is a default priority level setting of the at least one access controller apparatus.

27. The method of claim 26 wherein the default priority level setting of the at least one access controller apparatus is a lowest available priority level setting.

28. The method of claim 16 wherein the at least one command comprises at least one compound command.

29. The method of claim 16 wherein the at least one access controller apparatus comprises at least one movable barrier operator.

30. A method of operating at least one access controller apparatus for controlling physical access to an area, the method comprising:

receiving a first command to cause an operation of the at least one access controller apparatus, the first command being associated with a first priority level, the first command comprising at least one of an open-hold-open command, a close-hold-closed command, or a stop-hold-stopped command;

setting by a processing device a current priority level setting of the at least one access controller apparatus to the first priority level in response to receiving the first command and performing an operation associated with the first command;

receiving a second command to cause an operation of the at least one access controller apparatus, the second command being associated with a second priority level that is lower than the first priority level, the second command comprising at least one of an open command, a close command, or a stop command;

determining by the processing device that the associated second priority level of the second command is a lower priority level than the current priority level setting of the at least one access controller apparatus; and ignoring the second command in response to determining by the processing device that the associated second priority level of the second command is a lower priority level than the current priority level setting of the at least one access controller apparatus.

* * * * *